March 28, 1939.  E. RIEMENSCHNEIDER ET AL  2,151,871
WELDING ELECTRODE HOLDER
Filed Oct. 28, 1937
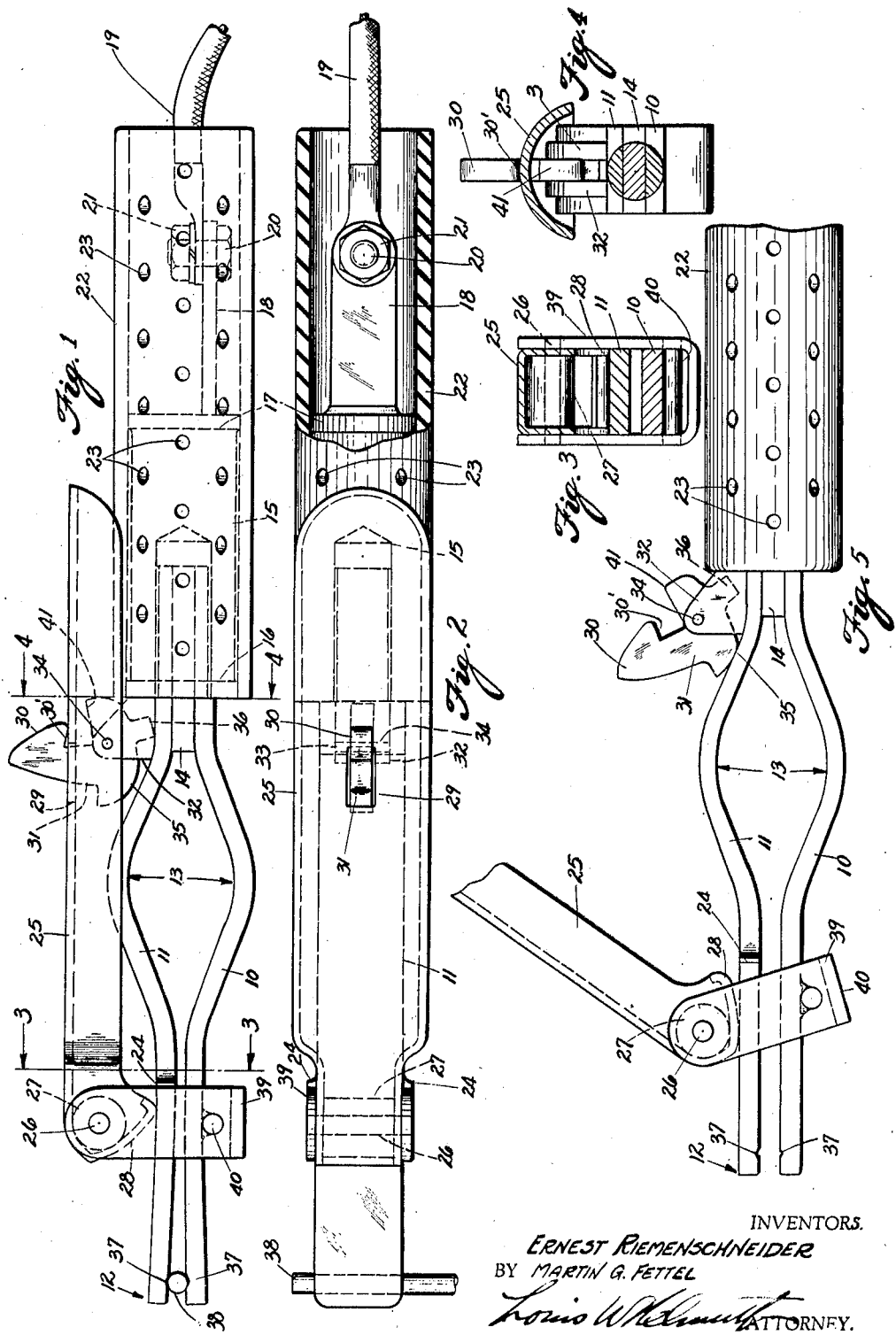
INVENTORS.
ERNEST RIEMENSCHNEIDER
BY MARTIN G. FETTEL
ATTORNEY.

Patented Mar. 28, 1939

2,151,871

UNITED STATES PATENT OFFICE 2,151,871

WELDING ELECTRODE HOLDER

Ernest Riemenschneider, Lakewood, and Martin G. Fettel, Cleveland, Ohio, assignors to The Midland Steel Products Company, Cleveland, Ohio, a corporation of Ohio Application October 28, 1937, Serial No. 171,426

3 Claims. (Cl. 219—8)

This invention relates to new and useful improvements in welding electrode holders and an important object of the invention is to provide a light and well balanced holder which relieves fatigue in using and operating the holder and one which can be rapidly operated by a flick of the operator's finger in gripping or releasing the electrode.

Another important object of the invention is to provide a holder which will establish a superior electrical connection with the welding electrode and in which the electrical current is transmitted equally to both jaws employed to grip the electrode.

Another object of the invention is to provide means for automatically latching the jaws of the holder and retaining them in gripping position.

A further object of the invention is to provide a cam action for closing the jaws of the holder, which cam has a rolling action as distinguished from a sliding movement.

A still further object of the invention is to provide an electrode holder which does not employ the usual coil springs which tend to lose their tension when subjected to the heat incident to the use of the holder.

Other objects and advantages of the invention will become apparent during the course of the following description.

In the accompanying drawing forming a part of the application and wherein like numerals are employed to designate like parts throughout the several views, Fig. 1 is a side elevation of the electrode holder with the jaws in closed position and the electrode in place.

Fig. 2 is a top plan of the same with a part of the handle broken away.

Fig. 3 is a transverse section taken on the line 3—3 of Fig. 1,

Fig. 4 is another transverse section taken on the line 4—4 of Fig. 1,

Fig. 5 is a side elevation of the electrode holder with part of the handle broken away and showing the jaws in release position.

Referring now more in detail to the accompanying drawing, the numerals 10 and 11 represent a pair of elongated spring metal jaw members having gripping portions 12 at their forward ends and somewhat centrally located outwardly bowed spring portions 13. The rear or inner ends of these two jaw members 10 and 11, are welded to a spacer bar 14 disposed therebetween. The rear portion of the jaw members 10 and 11 including the spacer bar 14 is provided with threads to thread into a cylindrical electrical conductor member 15 having circumferentially formed ribs 16 and 17 and a rearwardly extending part 18 forming a connection with the electrical conductor cable 19 by means of the bolt 20 and the nut 21.

The handle 22 is a tube of insulating material having a series of openings 23 to allow circulation of air in and through the handle to prevent it from becoming overheated. This handle 22 is tightly fitted over and retained by the ribs 16 and 17 of the conductor member 15.

Near the forward end of the jaw member 10 is welded a transverse pin 40, on the ends of which are pivotally mounted, the two arms of a U-shaped yoke 39. The bridge part of this yoke underlies the lower jaw 10 and the pivot 40 is located adjacent this bridge piece. The two arms of this yoke 39 straddle or embrace the free ends of the two jaws and extend a slight distance above the upper jaw 11. In order to limit the inward swinging movement of the yoke 39, the upper jaw 11 is provided with a pair of laterally extending shoulders 24. Between the upper ends of the yoke arms, a cam lever handle 25 is pivotally mounted on a pin 26 extending transversely through the upper ends of the two arms of the yoke 39, and a bushing 27 is positioned between the two sides of the pressed metal handle 25 to enclose the medial portion of the pin 26. The forward end of the cam lever handle 25 has a cam surface 28 formed thereon and engaging the top surface of the jaw member 11. As the handle 25 is swung down from the position shown in Fig. 5 to the position shown in Fig. 1, it will be noted that the yoke 39 is being moved rearwardly toward the handle as the cam surface 28 is rolling upon the upper surface of the jaw 11 to move the two jaws together until the rear edges of the yoke arms abut the lateral shoulders 24 of the jaw 11 and preclude further rearward movement of the yoke.

The cam lever 25 is of U-shaped cross section and its top or bridge portion adjacent its inner end is provided with an aperture 29 through which the nose 30 of a latch member 31 passes when the handle 25 is moved to close the jaws. This nose portion is formed with a slight upwardly inclined shoulder 30' to latch over the edge of the aperture 29 when the handle 25 is swung to lowermost clamping position. This latch is pivotally mounted off-center on a pin 34 carried by a pair of spaced supporting brackets 32 and 33 welded to the upper jaw member at its junction with the handle. This latch member is pivoted off center, so that its weight, when released from the handle member will swing it by gravity to the position shown in Fig. 5 until its stop portion 35 abuts the upper jaw and thereby holds the nose 30 of the latch member in position to pass through the aperture 29 in the clamping handle 25 when being swung to a latched position. This latch member is also provided with an extension 41 below the shoulder 30' so as to be engaged with the bridge part of the handle 25 as it is being moved to latched position in order that the handle 25 will swing the latch member 31 on its pivot rearwardly toward the handle and cause the shoulder 30' to catch over the rear edge of the aperture 29 to thereby retain the handle 25 in latched position, thereby holding the free ends of the jaws and their transverse grooves 37 in firm engagement with the electrode 38. In order to limit the rearward swinging movement of the latch member 31, its lower edge is provided with a downward extension or stop 36 which engages the upper surface of the jaw 11 when the latch is in locked position. The inherent spring qualities of the jaws 10 and 11 normally separate the jaws and place a force upon the handle 25 tending to swing it upwardly to the position shown in Fig. 5, which action yieldingly holds the rear edge of aperture 29 of the handle 25 in frictional engagement with the shoulder 30' of the latch member. This prevents accidental release of the handle with consequent opening of the jaws. This spring quality of the jaws also serves to keep them normally open to receive an electrode therebetween and dispenses with the usual faulty coil spring employed in other types of electrode holders. This spring quality of the jaws also serves to absorb some of the pressure of the jaws when an extra large diameter welding electrode is clamped therebetween. Due to the great pressure exercised by the cam 28, the jaws 10 and 11 may be made of heavy spring stock sufficiently heavy to withstand the heat of the welding operations without detrimental effects.

In order to release a welding electrode, gripped between the jaws, with the parts in the position shown in Fig. 1, it is simply necessary for the operator to flick the thumb of the hand holding the handle 22 to kick the nose 30 of the latch member to a position where its shoulder 30' will escape the rear edge of the opening 29 in the handle 25, and due to the inherent spring qualities of the jaws, they will promptly be released from the cam pressure and will spring apart to release the electrodes and kick the handle 25 up into the position shown in Fig. 5 where the jaws are ready to receive a new electrode after the one previously gripped has been completely used up in the welding operations. Due to the off-center pivoting of the latch member 31, it will be seen that it will repose in the position shown in Fig. 5 ready to again latch the handle 25 when it is swung down to the position shown in Fig. 1. It will also be apparent that the jaws 10 and 11 may be pivoted ones instead of relying upon the inherent spring qualities thereof for normally retaining them in open position, ready to grasp an electrode.

It is to be understood that various changes in the size, shape and relation of parts may be resorted to without departing from the spirit of the invention or the scope of the appended claims.

We claim:

1. An electrode holder comprising a pair of jaws fixed at one end and having their other ends normally sprung apart by their inherent spring tendencies, a cam handle connected to one jaw and bearing against the other to close the same against their spring tendencies, a latch adapted to be engaged with said handle when it is swung to close said jaws, said latch having a trip engageable with said handle in closing to move the latch over the handle, and the spring tendencies of said jaws at all times urging said handle away from said latch and jaw against which it bears.

2. An electrode holder comprising a pair of jaws fixed at one end and having their other ends normally sprung apart by their inherent spring tendencies, a cam handle connected to one jaw and bearing against the other, to close the same against their spring tendencies to separate and move the cam handle to a position permitting the jaws to separate, said handle having a slot, a gravity actuated latch pivotally connected to one jaw and adapted to be projected through said slot when the handle is swung to close said jaws, said latch having a shoulder and a curved nose engageable with the edge of the slot, said latch also having a trip engageable with said handle to force the nose and shoulder back in closing over the edge of the slot and fasten the handle in closed position, and said latch having a stop to engage one of the jaws when the handle is in release position to retain the latch nose in position to pass through the slot and engage its shoulder with the handle when the latter is moved to closed position.

3. An electrode holder comprising a pair of normally separated resilient jaws, fixed at one end and having their intermediate portions bowed outwardly, a yoke pivoted to one jaw and straddling both jaws, a sheet metal handle of U-shaped cross section pivoted to the yoke and having its pivoted end formed into a cam engageable with the other of said jaws to force them together, and said cam being so formed that the tendency of the jaws to spring apart forces the cam handle when in closed position toward a released position.

ERNEST RIEMENSCHNEIDER.
MARTIN G. FETTEL.